US007877727B2

(12) United States Patent
Sharp et al.

(10) Patent No.: US 7,877,727 B2
(45) Date of Patent: Jan. 25, 2011

(54) HIERARCHICAL STATE PROGRAMMING WITH A MARKUP LANGUAGE

(75) Inventors: Robert W. Sharp, San Diego, CA (US); Gopal K. Miglani, La Jolla, CA (US); Paul M. Freeman, Clive, IA (US)

(73) Assignee: BitRouter, San Diego, CA (US)

( * ) Notice: Subject to any disclaimer, the term of this patent is extended or adjusted under 35 U.S.C. 154(b) by 13 days.

(21) Appl. No.: 11/465,789

(22) Filed: Aug. 18, 2006

(65) Prior Publication Data

US 2008/0046817 A1    Feb. 21, 2008

(51) Int. Cl.
G06F 9/44    (2006.01)
(52) U.S. Cl. .................... 717/106; 715/762; 717/104; 717/107
(58) Field of Classification Search ............. 715/762; 717/104–107; 719/318
See application file for complete search history.

(56) References Cited

U.S. PATENT DOCUMENTS

| | | | | |
|---|---|---|---|---|
| 5,765,026 | A * | 6/1998 | Lin et al. ........................ 710/30 |
| 6,138,171 | A * | 10/2000 | Walker ........................ 719/318 |
| 6,374,144 | B1 * | 4/2002 | Viviani et al. .................. 700/12 |
| 6,941,521 | B2 | 9/2005 | Lin et al. |
| 6,990,654 | B2 | 1/2006 | Carroll, Jr. |
| 7,010,780 | B2 | 3/2006 | Perycz et al. |
| 7,039,893 | B2 | 5/2006 | DenBraber |
| 2003/0135842 | A1 | 7/2003 | Frey et al. |
| 2003/0169293 | A1 * | 9/2003 | Savage ........................ 345/762 |
| 2004/0010734 | A1 | 1/2004 | Ghercioiu et al. |
| 2004/0163046 | A1 * | 8/2004 | Chu et al. .................... 715/517 |
| 2004/0199897 | A1 | 10/2004 | Ghercioiu et al. |
| 2005/0120340 | A1 | 6/2005 | Skazinski et al. |
| 2005/0177816 | A1 | 8/2005 | Kudukoli et al. |
| 2006/0168526 | A1 * | 7/2006 | Stirbu ........................ 715/740 |
| 2006/0235548 | A1 * | 10/2006 | Gaudette ..................... 700/83 |

OTHER PUBLICATIONS

Mueller et al. "Interactive Multimodal User Interfaces for Mobile Devices", 2004, Proceedings of the 37$^{th}$ Hawaii International Conference on System Sciences, pp. 1-10.*
Blanch et al. "Programming Rich Interactions Using Hierarchical State Machine Toolkit", May 2006, Proceedings of the Working Conference on Advanced Visual Interfaces, pp. 51-58.*

(Continued)

*Primary Examiner*—Lewis A Bullock, Jr.
*Assistant Examiner*—Jue Wang
(74) *Attorney, Agent, or Firm*—Frommer Lawrence & Haug LLP; David W. Foster

(57) ABSTRACT

A method, system and apparatus are directed to application generation, and more particularly, to generating a user interface enabled application for an embedded device. A configuration file defining at least a hierarchical state machine (HSM) is received and/or pre-loaded. Based on the received configuration file, an intermediate version of the HSM is generated, wherein a child state of the intermediate version is enabled to pass an unconsumed event to a parent state of the child state. Based on the intermediate version, an invocation of at least one user interface (UI) element associated with a state of the intermediate version is enabled. The intermediate version may be executed and/or interpreted by an event-state engine on an embedded device.

17 Claims, 6 Drawing Sheets

OTHER PUBLICATIONS

Microsoft Corporation, Microsoft Computer Dictionary, May 1, 2002, Microsoft Press, Definition of source code.*

Heinzmann "Yet Another Hierarchical State Machine", Dec. 2004, Overload issue 64 Association of C & C++ Users, pp. 14-21.*

Traetteberg "Dialog Modelling with Interactors and UML Statecharts—A Hybrid Approach", 2003, Lecture Notes in Computer Science, vol. 2844/2003, 289-301.*

Harel, D.D. "Statecharts: A Visual Formalism for Complex System" Sci. Compu. Programming 8 (1987) 231-264.

The Code Project, http://www.codeproject.com/cs/library/statemachinetoolkitprtiii.asp.

State Chart SML (SCXML): State Machine Notation for Control Abstraction, http://www.w3.org/TR/scxml/.

XML Metadata Interchange, http://en.wikipedia.org/wiki/XMI.

Unified Modeling Language, https://en/wikipedia.org/wiki/unified_modeling_language.

State Diagram, http://en.wikipedia.org/wiki/state_diagram#UML_state_diagram.

Quantum Leaps, Innovating Embedded Systems, homepage, http://web.archive.org/web/20060427083154/http://www.quantum-leaps.com/.

NIST, National Institute of Standards and Technology, Finite State Machine, http://web.archive.org/web/20060423210819/http:/www.nist.gov/dads/HTML/finiteStateMachine.html.

* cited by examiner

*— 600*

1. If a ViewPort within the SubState has input focus, send the event to the ViewPort;

2. If the event is unconsumed AND if the SubState has an object with input focus AND if the event is a cursor movement event AND if this event is not overridden by a Reaction element, then:
    Unhighlight the currently highlighted menu item;
    Do any "Menu Item Unhighlighted" actions defined for the menu item being unhighlighted;
    Find the next highlightable menu item;
    Highlight that menu item;

3. If the event is unconsumed AND if a child state of SubState includes a menu item that has an input focus AND if the event is an ENTER event, then:
    Find any Reaction element handling the event for when the Menu Item is highlighted;
    If a Reaction element is found, then:
        Perform the Reaction element's action;
        If the action is to re-read the XML file, then go back to processing next event
    If the event is unconsumed, then:
        Enter the SubState;
        Erase the current state;
        Do any SubState Unhighlighting event actions defined in the configuration file;
        Step to any nested SubState transitions; and
        Draw the graphical elements for the new current SubState.

4. If the event is unconsumed, then process at least one Reaction element for the current SubState and determining if the event is handled by a Reaction element. If the event is not handled, process the Reaction element of the parent state, recursively, until the event is either handled by one of parent(s), or dropped.

*FIG. 6*

HIERARCHICAL STATE PROGRAMMING WITH A MARKUP LANGUAGE

FIELD OF THE INVENTION

The present invention relates generally to application programming interfaces and, more particularly, but not exclusively to generating a hierarchical state program and/or a user interface for embedded devices based on a markup language configuration file.

BACKGROUND OF THE INVENTION

Embedded devices, including set-top boxes provide a variety of services to the user, including control and/or access to consumer devices, entertainment devices (such as TV set-top boxes), business devices (such as Automated Teller Machines), or the like. Embedded devices often provide a simple look and feel. Increasingly, this look and feel is expected provide more advanced user interfaces and behaviors for more demanding applications.

Markup languages, including eXtensible Markup Language (XML), have become a mechanism for specifying data of different types, including, user, business, configuration data types, or the like. In general, a markup language enables a relatively standard mechanism for defining data so that a user can conveniently make changes to configurations and/or type(s) of data. It is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 6 illustrates the pseudo code of one embodiment for event handling, in accordance with the present invention.

DETAILED DESCRIPTION OF THE INVENTION

Figure 1:
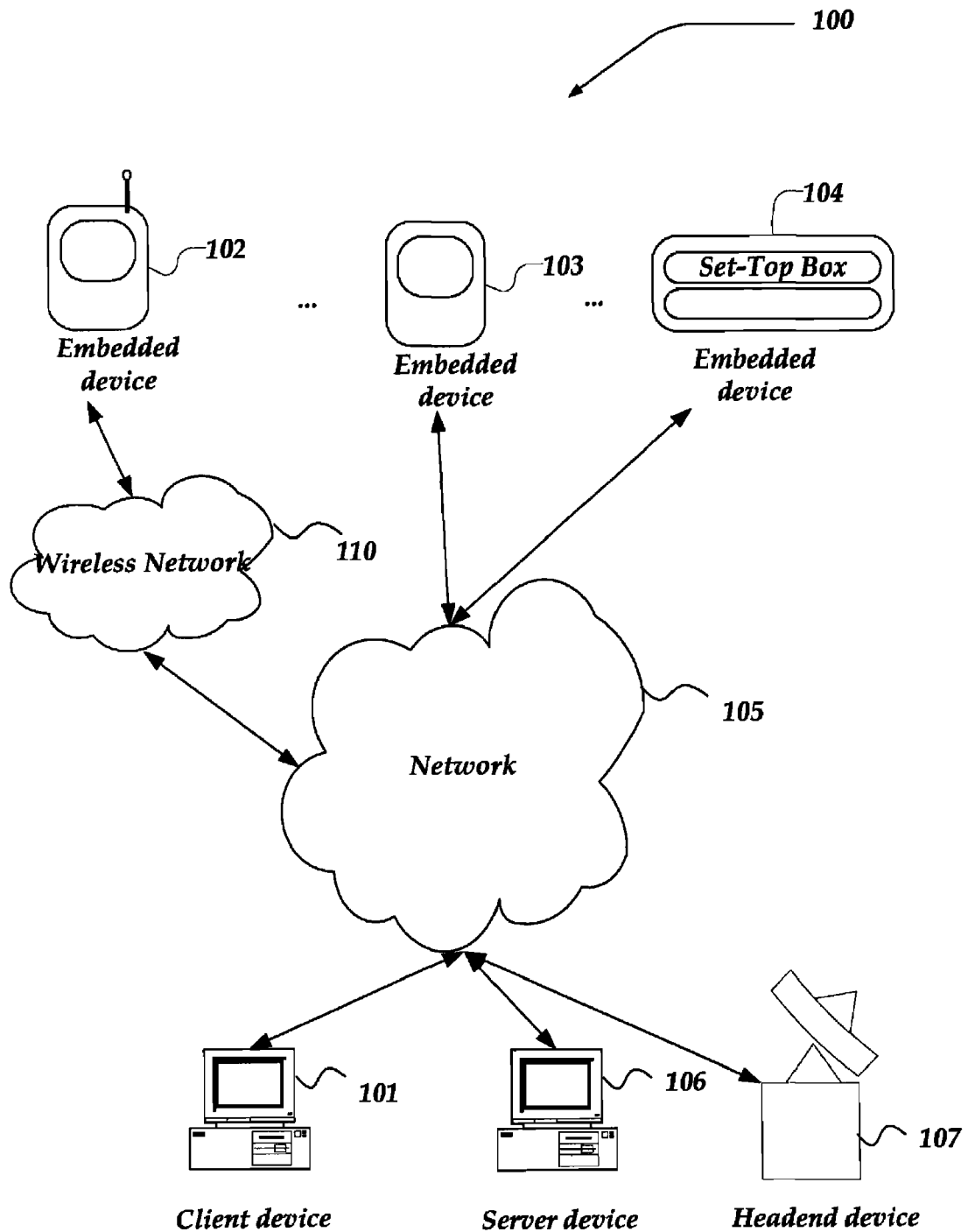
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "hierarchical state machine" (HSM) refers to at least a set of states and transitions between states based on at least the processing of events. In one embodiment, the HSM may operate substantially similar to the hierarchical state machine, state diagrams, state charts, or the like, described in David Harel's D. "Statecharts: A Visual Formalism for Complex Systems", Sci. Comput. Programming 8 (1987), 231-274.

Briefly, the present invention is directed to enabling a user to conveniently generate a user interface application for a target device. A configuration file defining the operation of at least an HSM is received at and/or loaded on a device. Based on the contents of the received configuration file, an intermediate version of the HSM is generated. A child state of the intermediate version is enabled to pass an unconsumed event to a parent state of the child state. Based on the intermediate version, at least one user interface (UI) element associated with a state of the intermediate version is invoked. The intermediate version may be executed and/or interpreted on the target device, which can include an embedded device, client device, peer device, server device, host device, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes broadcast networks/local area networks ("LANs")/wide area networks ("WANs")-(network) 105, wireless network 110, embedded devices 102-104, client device 101, server device 106, and headend device 107.

In one embodiment, server device 106 and headend device 107 include any device for communicating over a network. In one embodiment headend device 107 includes any cable, satellite, terrestrial headend, or the like for distributing content over a network, such as network 105, to wireless network 110, or the like. Server device 106 and/or headend device 107 may be configured to distribute digital and/or analog content to one of embedded devices 102-104, or the like.

One embodiment of embedded devices 102-104 is described in more detail below in conjunction with FIG. 2.

Generally, however, embedded devices 102-104 may include virtually any computing device capable of receiving and sending a message over a network, such as network 105, wireless network 110, or the like. Embedded devices 102-104 may also be described generally as client devices. Thus, embedded devices 102-104 may include virtually any portable computing device capable of connecting to another computing device and receiving information. Such devices include portable devices such as, television (TV) set-top boxes, embedded systems, consumer electronics, credit card swiping machines, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, embedded devices 102-104 typically range widely in terms of capabilities and features. For example, a TV set-top box may include a remote-control and/or control panel input, and an LCD display output; a cell phone may have a numeric keypad and a few lines of monochrome LCD display on which only text may be displayed.

In one embodiment, embedded devices 102-104 may include a client application that is configured to receive content from another computing device. The client application may include a capability to provide and receive textual content, graphical content, audio content, multimedia content (e.g. movies, TV shows, radio broadcasts) or the like. In one embodiment, the content may be stored locally (e.g. recorded on disk drive, or the like), or received remotely, over a network, or the like. The client application may also enable the user to subscribe to and/or pay for such content. The client application may also provide a program guide, list, identifiers, or virtually any form of descriptions associated with content to be shown, downloaded, recorded, and/or played on embedded devices 102-104. In one embodiment, embedded devices 102-104 may include a client application for receiving digital television media content, such as Digital Television (DTV) content over a High-Definition television (HDTV) format, or the like. The data format of digital television media content may include Advanced Television Systems Committee (ATSC) or the like.

In one embodiment, embedded devices 102-104 may include a client application for receiving media over at least one analog channel. The client application may include a digital tuner, analog tuner, filter, descrambler, decoder, amplifier, or the like. The client application may be coupled to hardware configured to receive the data over an analog channel. In one embodiment, the hardware and/or software may enable analog television (or analogue television) to encode/decode television picture and sound information as an analog signal, thorough a variation in the amplitude and/or frequencies of a signal, or the like. The communication format of the signal may include Standard Definition Television (SDTV), National Television System(s) Committee (NTSC), Sequential Color with Memory (SECAM), Phase-Alternating Line (PAL), or the like. In one embodiment, the data may be communicated using analog encoding/decoding and/or modulating onto Very High Frequency (VHF) and/or Ultra High Frequency (UHF), or the like.

In another example, embedded devices 102-104 may be web-enabled and/or may have a touch sensitive screen, a stylus, and several lines of color LCD display in which both text and graphics may be displayed. Embedded devices 102-104 may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message.

The client application may further provide information that identifies itself, including a type, capability, name, and the like. In one embodiment, embedded devices 102-104 may uniquely identify themselves through any of a variety of mechanisms, including a geographical identifier, unique user identifier, phone number, Mobile Identification Number (MIN), an electronic serial number (ESN), other device identifier, or the like. The information may also indicate a content format that the embedded device is enabled to employ. Such information may be provided in a message, or the like, sent to server device 106, headend device 107, client device 101, or other computing devices. Moreover, embedded devices 102-104 may further provide information associated with its physical location to another computing device.

Embedded devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as server device 106, headend device 107, client device 101, or the like. However, the present invention is not limited to these message protocols, and virtually any other message protocol may be employed.

Embedded devices 102-104 may be further configured to enable a user to participate in communication sessions, such as IM sessions. As such, embedded devices 102-104 may include a client application that is configured to interact with the browser application, email application, IM application, SMS application, MMS application, IRC application, or the like.

Embedded devices 102-104 may further be configured to include a client application that enables the end-user to log into an end-user account that may be managed by another computing device, such as server device 106, headend device 107, client device 101, or the like. Such end-user account, for example, may be configured to enable the end-user to control and/or access programming information, control and/or access content, receive emails, send/receive IM messages, SMS messages, access selected web pages, or the like.

In addition, embedded devices 102-104 may enable a user interface (UI) and behaviors associated with the UI to manage such operations, communications and/or content, as described above. For example, embedded devices 102-104 may include software libraries, hardware, firmware, or the like which enables the UI or UI definitions. Such UI may include graphical displays, text display, or the like. Such UI may include inputs for key input, text input, voice input, mouse press input, or virtually any type of user input. Such UI may be coupled to, for example, a set of behaviors for providing and/or controlling content, and/or providing user login and access, or the like. In one embodiment, embedded devices 102-104 may receive a configuration file for defining the UI and/or associated behaviors, over network 105 and/or network 110, from client device 101, server device 106, headend device 107, or the like. Embedded devices 102-104 may enable receiving the configuration file, enabling the UI and/or associated behaviors, or the like, by utilizing process 500 of FIG. 5, described below.

Client device 101 may include virtually any computing device capable of communicating over a network to send and receive information, or the like. The set of such devices may include devices that typically connect using a wired or wireless communications medium such as personal computers, multiprocessor systems, microprocessor-based or programmable consumer electronics, network PCs, or the like. Moreover, client device 101 may be configured to perform many of the actions described above for embedded devices 102-104. In addition, in at least one embodiment, server device 106 or headend device 107 may provide a configuration file, or the like, for defining a UI and/or associated behaviors, over network 105 and/or network 110, to client device 101, or the like. In one embodiment, the configuration file may include a format substantially similar to configuration file 400 of FIG. 4, described below.

Wireless network 110 is configured to couple mobile devices, such as embedded device 102, and their components with network 105. Wireless network 110 may include any of a variety of wireless sub-networks that may further overlay stand-alone ad-hoc networks, and the like, to provide an infrastructure-oriented connection for mobile devices. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, IEEE 802.16 Worldwide Interoperability for Microwave Access (WiMax), Ultra Wide Band (UWB), Wireless Router (WR) mesh, and the like. Access technologies such as 2G, 3G, 4G, and future access networks may enable wide area coverage for embedded devices, such as embedded devices 102 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), Universal Mobile Telecommunications Service (UMTS), or the like. In essence, wireless network 110 may include virtually any wireless communication mechanism by which information may travel between mobile devices and another computing device, network, and the like.

Network 105 is configured to couple server device 106, headend device 107, client device 101, or the like and its components with other computing devices, including, embedded devices 102-104, and through wireless network 110 to embedded devices 102. Network 105 is enabled to employ any form of computer readable media for communicating information from one electronic device to another.

In one embodiment, network 105 may include a media network, such as a cable television network, a Community Antenna Television (CATV) network, a digital cable network, a satellite television network, or the like, for providing content over a direct connection, or the like. The media network may provide analog and/or digital communication. In one embodiment, media may be sent on one sub-network and communications may be sent as digital data. In one embodiment, network 105 may include proprietary protocols for managing content, such as television shows, movies, games, program guides, or the like. In this embodiment, network 105 may enable HDTV, or the like. In one embodiment, media may be sent on one sub-network as analog data, and communications may be sent on a digital network. In one embodiment, the analog data may be transmitted within a plurality of frequencies (e.g. channels), or the like. In one embodiment, the use of different frequencies (e.g. mixed signal) allows many channels to be distributed over the same network, without separate wires, connections, or the like, for each signal. A tuner of the receiving device, such as embedded devices 102-104 may be enabled to select one channel from this mixed signal. In this embodiment, network 105 may enable SDTV, or the like Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between server device 106, headend device 107, client device 101, and other computing devices.

Additionally, communication media typically embodies processor readable data, computer-readable instructions, data structures, program modules, components, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Illustrative Embedded Device

Figure 2:
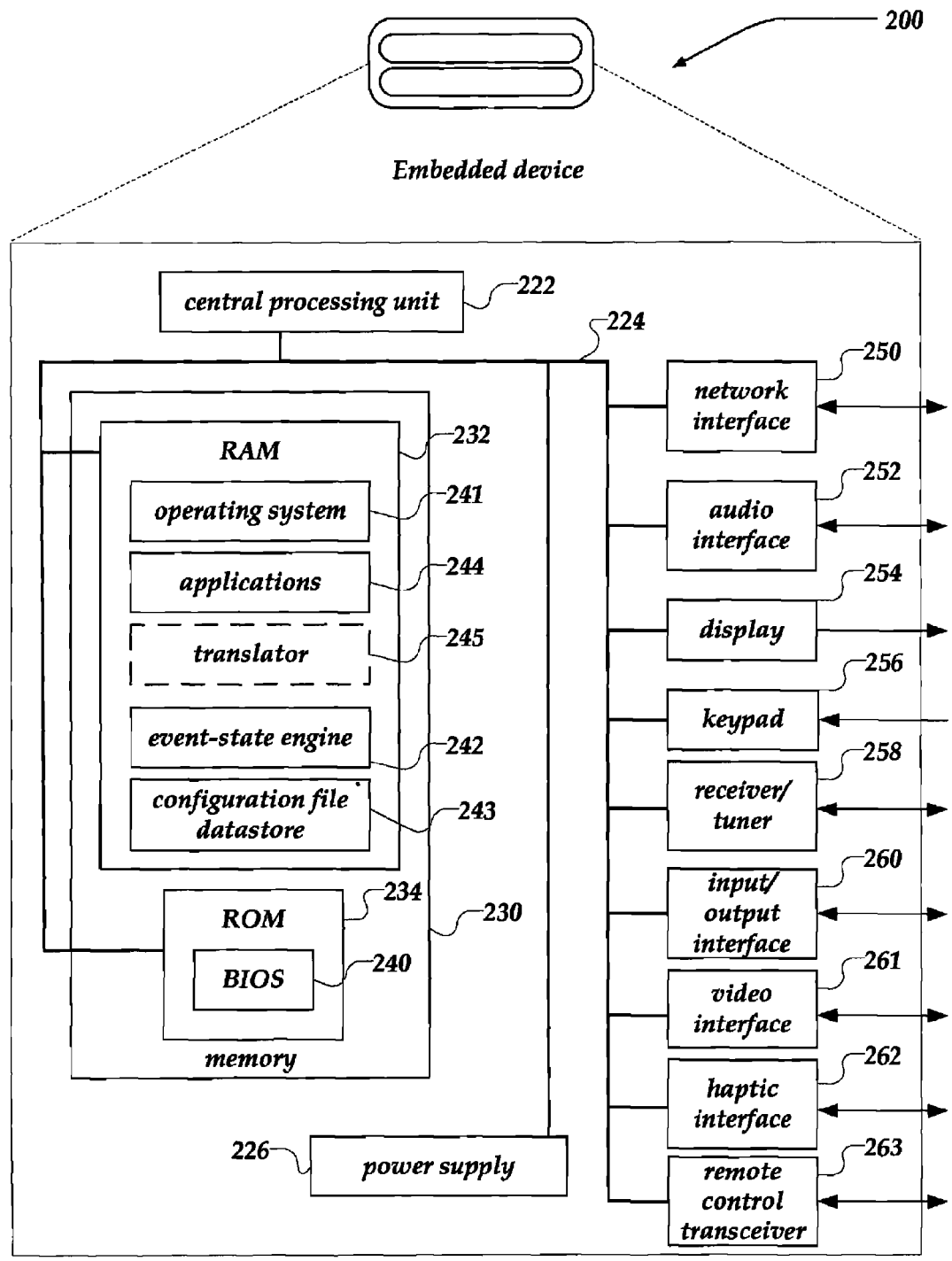
FIG. 2 shows one embodiment of an embedded device that may be included in a system implementing the invention.

FIG. 2 shows one embodiment of an embedded device that may be included in a system implementing one embodiment of the invention. Device 200 may include many more or less components than those shown in FIG. 2. However, the components shown are sufficient to disclose an illustrative embodiment for practicing the present invention. Device 200 may represent, for example, embedded devices 102-104 of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, receiver/tuner 258, an input/output interface 260, a haptic interface 262, translator 245, and an event-state engine 242. As shown, applications 244, translator 245, event-state engine 242, and configuration file datastore 243 may be components stored in memory. In one embodiment, these components may include processor readable data/medium, or the like.

Power supply 226 provides power to device 200. A rechargeable or non-rechargeable battery may be used to provide power. The power may also be provided by an external power source, such as an AC adapter or a powered docking cradle that supplements and/or recharges a battery.

Device 200 may optionally communicate with a base station (not shown), or directly with another computing device. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), Wide CDMA (WCDMA), CDMA 2000, Universal Mobile Telecommunications Service (UMTS), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Video interface 261 is arranged to produce and receive video signals such as component video signals, or the like. In one embodiment, video interface 261 may provide output suitable for display on a TV, an HDTV, or the like. Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. Display 254 may also include input/output methods such as buttons, knobs, keys, or the like. In one embodiment, display 254 may include a front panel display configured to control at least receiver/tuner 258 or the like.

Keypad 256 may comprise any input device arranged to receive input from a user. For example, keypad 256 may include a push button numeric dial, or a keyboard. Keypad 256 may also include command buttons that are associated with selecting and sending images. An illuminator (not shown) may provide a status indication and/or provide light. The illuminator may remain active for specific periods of time or in response to events. For example, when the illuminator is active, it may backlight the buttons on keypad 256 and stay on while the client device is powered. Also, the illuminator may backlight these buttons in various patterns when particular actions are performed, such as dialing another client device. The illuminator may also cause light sources positioned within a transparent or translucent case of the client device to illuminate in response to actions.

Receiver/tuner 258 is arranged to select, receive, and/or decode media data over a network, or the like. In one embodiment, the data may be digital data, such as HDTV data or the like. In another embodiment, the data may be analog data received over a frequency, or the like. In one embodiment, receiver/tuner 258 may be configured to decode SDTV, NTSC, SECAM, PAL, CATV, or the like, to retrieve the analog data. Receiver/tuner 258 may be enabled to send the data to display 254 for display. Receiver/tuner 258 may be controlled by CPU 222 to select a frequency, or the like, to send data to another component, or the like. In one embodiment, receiver/tuner 258 may be configured to digitize the analog data and/or to send such digitized data to CPU 222 for further processing.

Device 200 also comprises input/output interface 260 for communicating with external devices, such as a remote control interface, a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate device 200 in a particular way when another user of a computing device is calling.

Device 200 also comprises remote control transceiver 263 for wireless communication with another device. The other device may control at least some of the operation of device 200, such as controlling the receiver/tuner 258, or the like.

Optional global positioning systems (GPS) transceiver (not shown), can determine the physical coordinates of device 200 on the surface of the Earth, which typically outputs a location as latitude and longitude values. The GPS transceiver can also employ other geo-positioning mechanisms, including, but not limited to, triangulation, assisted GPS (AGPS), E-OTD, CI, SAI, ETA, BSS or the like, to further determine the physical location of device 200 on the surface of the Earth. It is understood that under different conditions, the GPS transceiver can determine a physical location within millimeters for device 200; and in other cases, the determined physical location may be less precise, such as within a meter or significantly greater distances. In one embodiment, however, device 200 may, through other components, provide other information that might be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 may store a basic input/output system ("BIOS") 240 for controlling low-level operation of device 200. The mass memory also stores an operating system 241 for controlling the operation of device 200. It will be appreciated that this component may include a general purpose operating system such as LINUX™ or another version of UNIX, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage, which can be utilized by device 200 to store, among other things, applications 244 and/or other data. For example, data storage may also be employed to store information that describes various capabilities of device 200. The information may then be provided to another device based on any of a variety of events, including being sent as part of a header during a communication, sent upon request, or the like. Moreover, data storage 244 may also be employed to store social networking information, or the like. At least a portion of the social networking information may also be stored on a disk drive or other storage medium (not shown) within device 200.

Applications 244 may include computer executable instructions which, when executed by device 200, transmit, receive, and/or otherwise process messages (e.g., SMS, MMS, IM, email, and/or other messages), multimedia content, and enable telecommunication with another user of another client device. In one embodiment, applications 244 may receive program guide(s), or the like, and is configured to manage such program guide(s). In one embodiment, applications 244 may be configured to further process digitized multimedia content and/or send such content to display 254, network interface 250, or the like, for further processing (or display). Other examples of application programs include calendars, browsers, email clients, IM applications, SMS applications, VOIP applications, contact managers, task managers, transcoders, database programs, word processing programs, security applications, spreadsheet programs, games, search programs, and so forth.

Operating system 241 may include an application programming interface (API) to enable operations of device 200, provide communications with other devices, control and/or access to content, or other information, or the like.

Translator 245 includes any mechanism for reading a configuration file and/or generating an executable/interpretable event driven HSM based on the configuration file. Translator 245 may perform at least a portion of process 500 of FIG. 5. In one embodiment, translator 245 may receive the configuration file from network interface unit 250, from a data storage including RAM 232 or secondary storage such as a disk drive (not shown), or the like. Translator 245 may read the configuration file and may generate an executable version/intermediate version of the HSM for further processing. In one embodiment, translator 245 may be an optional component and may not exist on device 200. Instead, the executable/interpretable event driven HSM may be sent to device 200 from another device.

In one embodiment, the executable version of the HSM may include an intermediate representation (i.e. an intermediate version), such as a data structure embodying the HSM, or the like (e.g. a graph of the event-states, or the like). In one embodiment, the intermediate representation may be stored and/or otherwise loaded into non-volatile memory (not shown), or the like. In one embodiment, the intermediate representation may include linked-lists. In one embodiment, the contents of the linked-lists included in an intermediate representation may correspond at least to some elements of the attributes and/or tags of a configuration file, such as configuration file 400 of FIG. 4, or the like. For example, the terms "TopState" and "SubState" refer to data structures which embody a first state or a subsequent state, respectively, of an HSM. "Viewport" refers to a graphical user interface (GUI) window, windowing arrangement, configuration, or the like. In one embodiment, the content of the linked-list may be directed to: 1) background objects (e.g. defining the look of SubStates' backgrounds), 2) timer objects, 3) Font objects, 4) ViewPort objects, 5) SubStates objects, or the like. In one embodiment, the head object of the linked list may include a TopState data structure. The SubState data structure may include 1) a pointer to the SubState's parent SubState, 2) a name of the SubState (e.g., its "ID" attribute value, if any) 3) a pointer to objects defining the SubState's visual appearance (e.g. if used in a menuing system), 4) a linked-list of Reaction objects defining the SubState's behavior, 5) a linked-list of ViewPort objects contained in SubState, or the like. In one embodiment, the TopState data structure may include other fields for facilitating menu focus overrides and/or other UI specific data fields, such as a list of textboxes contained in the SubState, and information on which things in the SubState are highlighted, have input focus, or the like. Thus, the TopState data structure may include information for traversing the linked list and for further processing the linked list to provide behaviors and/or UI elements. In another embodiment, the intermediate representation is embodied in binary data or the like, and is not source code, comprising programming language instructions or the like.

In another embodiment, translator 245 may generate object code. The object code may include processor readable instructions corresponding to function calls, or the like, to user interface routines, or the like, and corresponding to at least one state and/or transition between the states. In another embodiment, translator 245 generates an intermediate representation enabled to be interpreted by event-state engine 242 to perform user interface actions or the like.

Event-state engine 242 includes any mechanism for reading an executable version/intermediate version of the HSM and for performing at least one user interface action based on at least a portion of the executable version/intermediate version of the HSM. Event-state engine 242 may perform at least a portion of process 500 of FIG. 5. In one embodiment, event-state engine 242 may act as a virtual machine, an interpreter or the like. In one embodiment, event-state engine 242 may enable at least one thread of an operation, may perform at least one user interface action defined by the executable version/intermediate version of the HSM, may maintain a state of the currently executing HSM, or the like. In one embodiment, event-state engine 242 may manage the generation and/or storage of UI elements such as fonts, images, or the like. Such UI elements may be stored in a datastore, such as RAM, ROM, disk drive (not shown), or virtually any datastore.

Configuration file datastore 243 may include any mechanism for storing a configuration file, receiving the configuration file over network interface 250, enabling the loading of the configuration file, or the like. Configuration file datastore 243 may provide a configuration file to translator 242 for further processing.

Illustrative Server Environment

Figure 3:
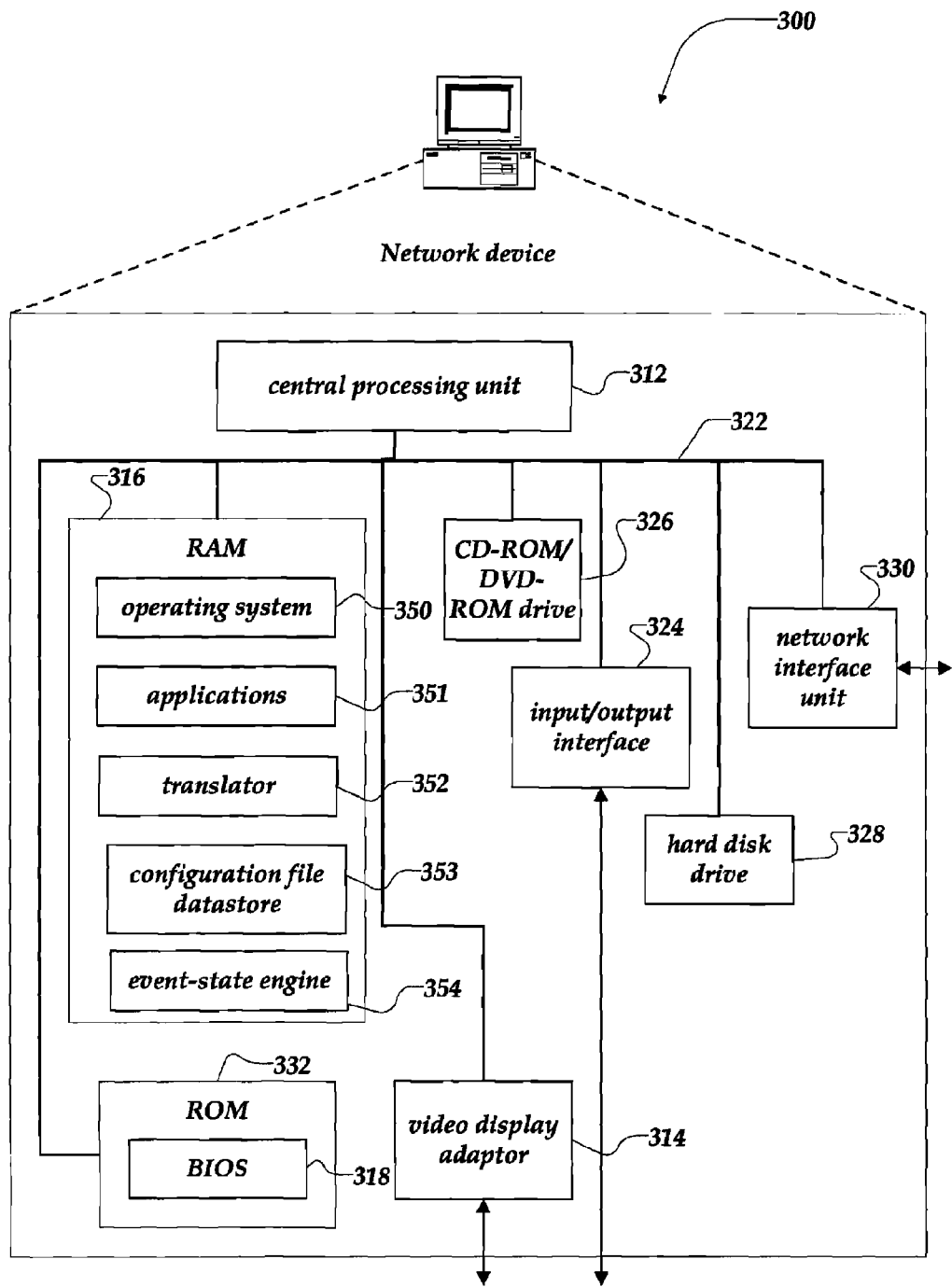
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, server device 106, headend device 107, and/or client device 101 of FIG. 1.

Network device 300 includes processing unit 312, video display adapter 314, and a mass memory (e.g. hard disk drive 328, CD-ROM/DVD ROM drive 326), all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 350 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC). Network device 300 also includes input/output interface 324 configured to enable communication with another device, such as a mouse, keyboard, or the like. Network device 300 also includes translator 352, configuration file datastore 353, and event-state engine 354.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 351 are loaded into mass memory and run on operating system 350. Examples of application programs may include video servers, video-on-demand servers, CableCARD validation servers, digital television server applications, electronic program guide data server, data carousel server, transcoders, schedulers, calendars, database programs, word processing programs, HTTP programs, customizable user interface programs, IPSec applications, encryption programs, security programs, VPN programs, SMS message servers, IM message servers, email servers, account manager and so forth.

Translator 352 may include any mechanism for reading a configuration file and/or generating an executable event driven HSM based on the configuration file. Translator 352 operates substantially similarly to translator 245 of FIG. 2. The difference being that translator 352 sends the generated executable version/intermediate version of the HSM to another device (e.g. embedded device) over network interface unit 330 for further processing. Translator 352 may perform at least a portion of process 500 of FIG. 5.

Configuration file datastore 353 may include any mechanism for storing a configuration file, receiving the configuration file over network interface 330, or the like. Configuration file datastore 353 operates substantially similarly to configuration file datastore 243 of FIG. 2.

Event-state engine 354 includes any mechanism for reading an executable version/intermediate version of the HSM substantially similar to event-state engine 242 of FIG. 2.

Illustrative Configuration File

Figure 4:
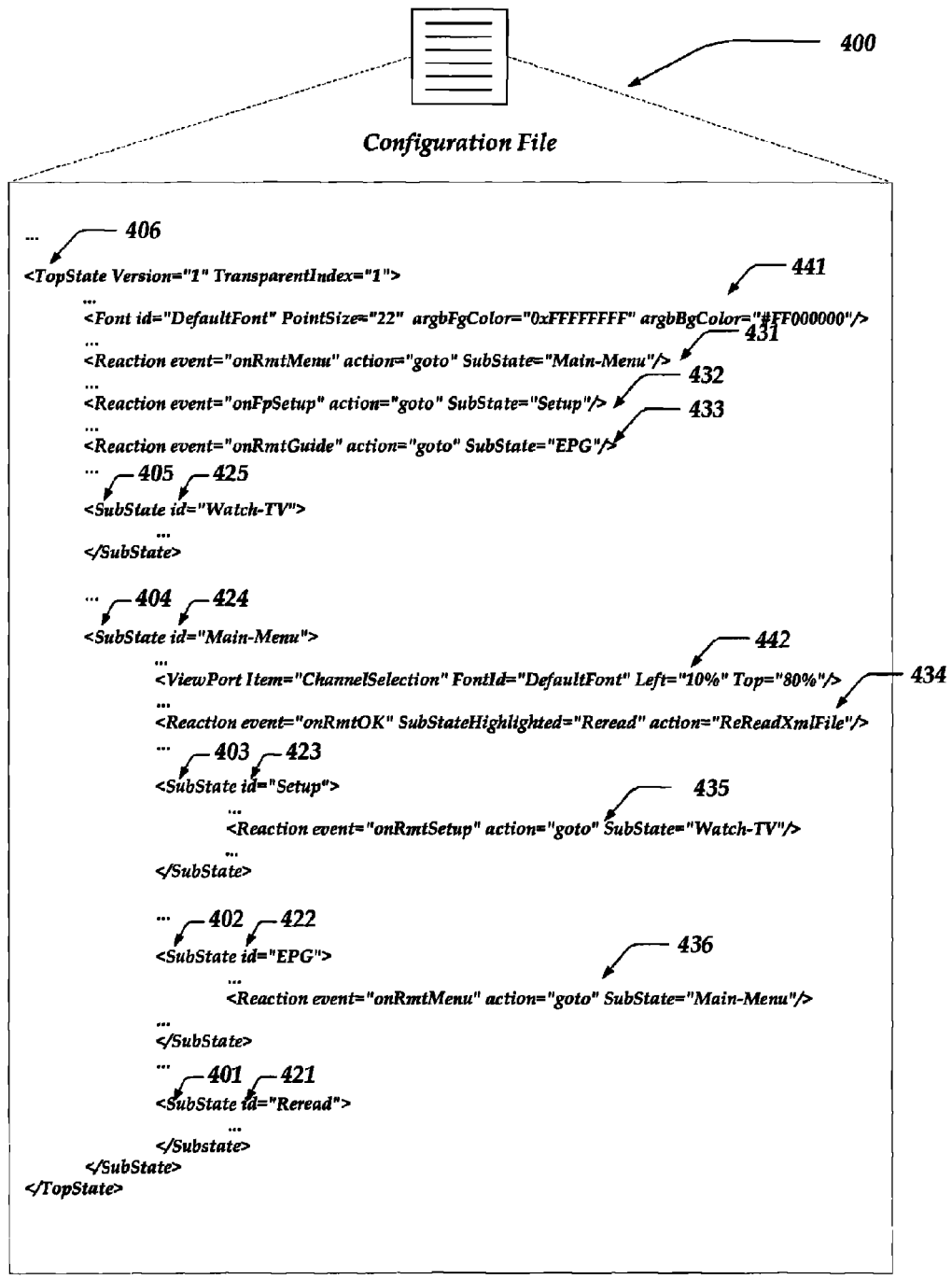
FIG. 4 shows one embodiment of a configuration file for use in generating a user interface enabled application.

FIG. 4 shows one embodiment of a configuration file for enabling performance of an event-driven state machine on an embedded device, or the like. As shown, file 400 is an XML file, but may be of any format configured to represent hierarchical states and events. The configuration file may be read by a processor and stored in a processor readable medium. The configuration file may provide instructions to be stored in the processor readable medium, wherein the instructions are executable by the processor to perform the steps as described in process 500 of FIG. 5, below.

As shown, file 400 of FIG. 4 defines hierarchical skins, and an HSM As used herein, the term "hierarchical skin" refers to a set of GUI elements used to display one or more windows associated with one or more states in the HSM, or the like. File 400 is used to define each state and the state's association with a behavior and/or a GUI element. For example, file 400 includes markup tags 401-406, and attributes 421-425. Each markup tag of markup tags 401-405 represents a child state embedded within a parent markup tag representing a parent state. As shown markup tag 401 is a child markup tag of parent markup tag 404. File 400 includes one top markup tag, which has no parent markup tag. As shown, tag 406 is a top markup tag.

Each state may also be associated with a reaction, e.g., an event and a resulting behavior. As shown, file 400 includes reaction tags 431-436 to, among other things, indicate an event is to be consumed by the child state, or passed to a parent state, if the event is unconsumed. Each markup tag of file 400 may include at least one attribute. For example, reaction tags 431-436 may define an action (e.g. defined by "action" attribute) associated with a named event (e.g. defined by "event" attribute), a state to transition to based on the action (e.g. defined by "SubState" attribute), and/or an action associated with an API call (e.g. "ReReadXMLFile"). Thus, reaction tags 431-436 may define a transition to another state. Underlying API calls embedded within the "action," may control an embedded system such as a set-top box, or mobile phone, or the like. The underlying API call may be associated to a particular chipset. Additionally, as shown, attributes 421-425 may name a user interface (UI) element associated with the corresponding child markup tag so it can be referenced elsewhere in the configuration file As shown, configuration file 400 may include UI elements 441-442. UI elements may be of a variety of types, include font types (e.g., defined by "Font" tag), a viewport type (e.g. defined by "Viewport" tag), a view item to be displayed within a viewport (e.g. defined by "View" tag), or the like. Virtually any type of UI element types may be defined, including textboxes, timers, menus, popups, or the like. As shown, the UI elements 441-442 define the UI elements associated with a state or children of the state. For example, UI element 441 defines a font for all states within TopState. However, another "Font" type UI element may override this setting within a child of TopState.

Generalized Operation

Figure 5:
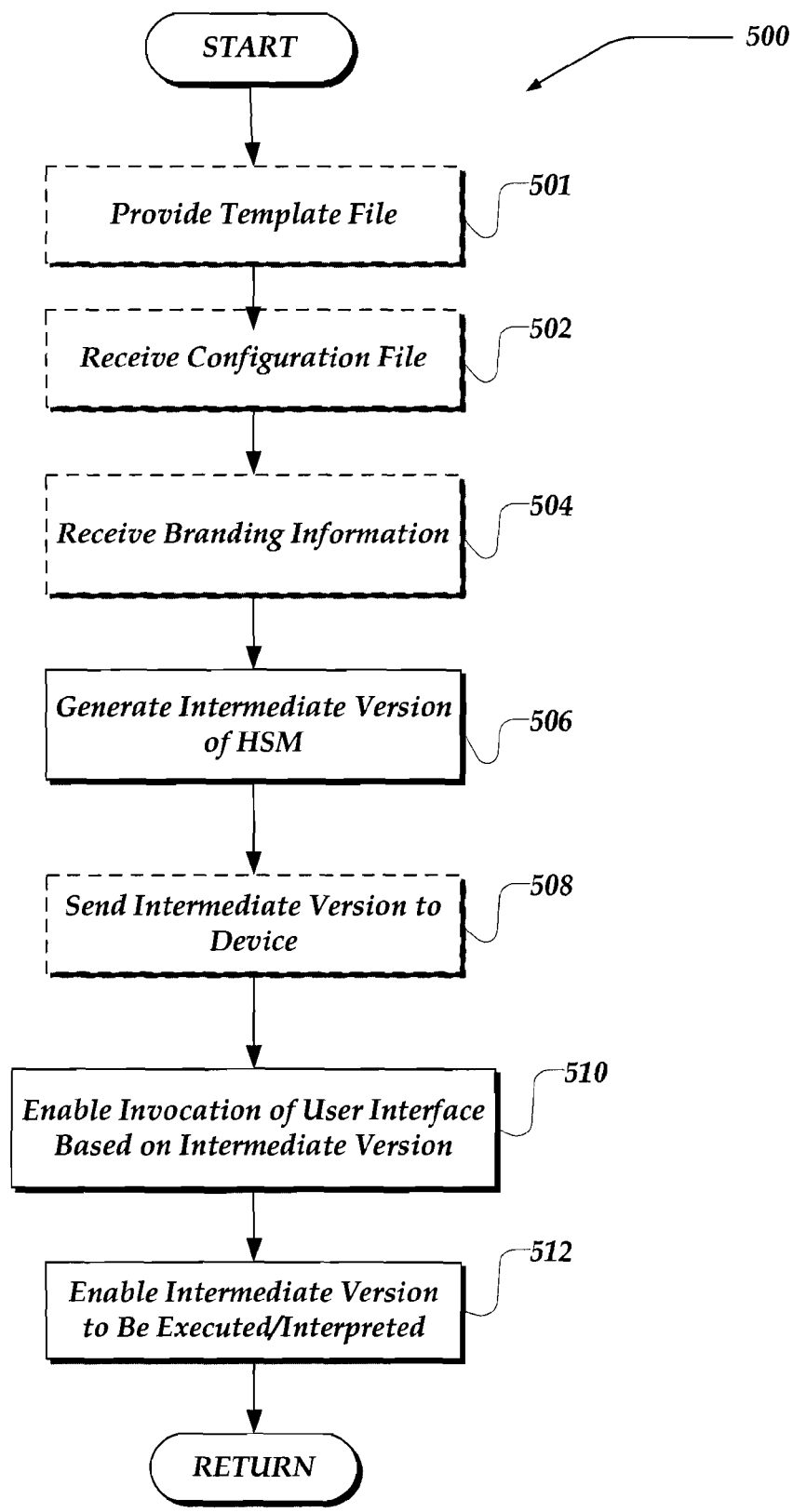
FIG. 5 illustrates a logical flow diagram generally showing one embodiment of a process for generating a user interface enabled application.

The operation of certain aspects of the invention will now be described with respect to FIG. 5. FIG. 5 illustrates a logical flow diagram generally showing one embodiment of a process for application generation. Process 500 of FIG. 5 may be implemented within server device 106, client device 101, and/or embedded devices 102-104 of FIG. 1.

Process 500 begins, after a start block, at block 501, where a template file is provided for editing a configuration file for an HSM. In one embodiment, the template file may be a definition grammar for the configuration file, such as a Document Type Definition (DTD), or the like. In one embodiment, the template file may be a markup language text file with pre-defined fields to be edited. The configuration file may be generated and/or edited based on the template file.

Processing next steps to block 502, where the configuration file defining at least an HSM is received. In one embodiment, receiving may comprise loading the configuration file onto a device. In one embodiment, the configuration file may be pre-loaded on the device. In another embodiment, the configuration file may be received over a network, or the like. In one embodiment, the configuration file is a markup language text file. In another embodiment, the configuration file further defines a displayable skin. In yet another embodiment, at least one definition of one hierarchical state included in the configuration file indicates a behavior. As used herein, a behavior includes at least one action associated with a state and/or condition of an operation of a device, including an embedded device, or the like.

Processing next continues to block 504, where branding information is provided to be combined with the HSM to generate an intermediate version, wherein the UI displays the branding information. As used herein, "branding" refers to the process of combining branding information with the intermediate version. Branding information may be received within the configuration file, in another file, in a library, loaded on the embedded device, or the like. The branding information may include logos, icons, colors, text and/or multimedia content associated with a service, company, person, or virtually any identifiable entity. In one embodiment, the branding information may be combined with the HSM by being associated with a characteristic of a plurality of states within the HSM. Such characteristics may include the color displayed for each associated display of each state, a hot key input of a state, an opening introductory screen, sound, or the like.

In an alternate embodiment (not shown), blocks 501, 502 and 504 may not be processed. Instead, processing may begin at block 506. In this embodiment, the configuration file and/or branding information may be loaded/pre-loaded on a device, and available for further processing.

Processing next continues to block 506 where the intermediate version of the HSM is generated. In one embodiment, the generation may include reading the configuration file, verifying the file against a definition grammar, or the like, and writing at least some data based on the elements of the configuration file. In one embodiment, the configuration file may be an XML file, and the definition grammar may be a Document Type Definition (DTD), or the like. In one embodiment, the writing may be based on an element per element basis. In another embodiment, the complete XML configuration file may be read into a Document Object Model (DOM), and the DOM may be read and/or transcoded into data suitable for execution and/or interpretation.

In one embodiment, the HSM may be generated, such that a child state of the intermediate version is enabled to pass an unconsumed event to a parent state of the child state. In this embodiment, the intermediate version is event-driven. In one embodiment, generating comprises parsing the configuration file to generate a hierarchical skin. In one embodiment, the intermediate version may be enabled to be interpreted and/or executed for a particular device type, system configuration, or the like. In one embodiment, an instruction in the configuration file, an instruction entered by a user, or the like, may determine the device type, system configuration, or the like. In one embodiment, the intermediate version is an intermediate representation, an object code, an executable object, or the like.

In one embodiment, the intermediate version may be a linked list of nodes, representing states, a compressed representation, a hash table, or virtually any data structure embodied in byte code, binary code, or the like. In one embodiment, the intermediate version may be executed by an interpreter, a virtual machine, or the like. In one embodiment, the intermediate version may include instructions enabled to be executed by a processor and/or data to be interpreted by a processor. In one embodiment, generating may comprise combining the HSM with a library of behaviors to be performed on the device. In this embodiment, generating may comprise combining a portion of the library with the intermediate version based on an indication of a behavior to be performed during a state of the HSM.

Processing next continues to block 508, where the event-driven intermediate version is sent to a device for execution, for interpretation, and/or for displaying a user interface (UI) element associated with a state of the event-driven intermediate version. In one embodiment, the version is sent to a device of the determined type. In one embodiment, the configuration file may be received and/or configured on one device, and sent to the embedded device for generation, branding, execution or the like. In this embodiment, block 508 occurs before block 504. In one embodiment, block 508 may not be performed because blocks 502, 504, and 506 may be performed on the device itself, and thus the event-driven intermediate version may already reside on the device. Alternatively, the event-drive intermediate version may be loaded into non-volatile memory on the device or the like.

Processing next continues to block 510, where based on the intermediate version, an invocation of at least one user interface (UI) element associated with a state of the intermediate version is enabled. In one embodiment, an interpreter (e.g. event-state engine), executing on an embedded device may read a data structure within the intermediate version. In one embodiment, the interpreter may create, display, pre-cache, and/or otherwise process a UI elements associated with the data structure, if the data structure is indicated to be activated, such as by a currently active state of the embedded device, a user input, or the like. In one embodiment, the interpreter may invoke an underlying API or other code associated with the UI element to create, display, pre-cache, and/or otherwise process the UI elements. In one embodiment, the UI elements may be displayable on a device comprising an embedded device, a mobile device, a television set-top box, or the like. In one embodiment, the UI elements may be defined by the data fields of at least one element of a linked-list intermediate representation, as described above. In this embodiment, the UI elements may be defined by the data fields of a SubState data structure, as described above in conjunction with FIG. 2.

Processing next continues to block 512, where the intermediate version is enabled to be executed and/or interpreted. In one embodiment, as described above, the intermediate version is an interpretable intermediate representation. In this embodiment, an event-state engine may be enabled to execute the intermediate version, by interpreting the intermediate version's currently active state, or the like. Thus, the event-state engine (or any other interpreter) is enabled to perform an action based on a portion of the intermediate version. In one embodiment, the event-state engine may begin execution in a state associated with the head SubState data structure ("TopState") of the intermediate representation. For example, an action associated with the entry into the TopState may be activated. The event-state engine may begin execution of a sub state associated with the TopState. When a sub state is entered, the transitioning may continue to further nested sub states of the current state, or the like. In one embodiment, the even-state engine may also perform event-processing/dispatching on at least one event for at least one state of the HSM.

In another embodiment, the intermediate version may be an executable object, and may be enabled to be executed by having a processor read an instruction of the intermediate version and performing an action based on the instruction. In one embodiment, enabling the intermediate version to be executed comprises displaying a hierarchical skin associated with an active state of the executable version. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Event Handling Operation

FIG. 6 illustrates one example of an event-processing pseudo-code. In one embodiment, the event-state engine 242 of FIG. 2 may perform pseudo-code 600 of FIG. 6. Pseudo-code 600 illustrates one possible embodiment, and other embodiments may be used to process events with an HSM, without departing from the spirit of the invention. As shown, pseudo-code 600 shows that after an event has been received, event-state engine may proceed to enable the current state to consume the event or pass the event to a parent state, or the like.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method for application generation, comprising:
providing a template for editing of a configuration file for a hierarchical state machine (HSM);
employing the configuration file to define at least the HSM and to generate an intermediate version of the HSM, wherein the intermediate version of the HSM includes linked-lists corresponding to at least some elements of the configuration file, wherein the linked-list further comprises a top-state and at least one sub-state, said top-state comprising of information for traversing the linked-list and processing the sub-states and said sub-states comprising a pointer to a parent sub-state and an ID of the sub-state, wherein each sub-state of the HSM defines a linked-list of user interface (UI) elements, wherein the HSM is in a current child sub-state of a parent sub-state, wherein the parent sub-state defines a reaction element defining transition to a third sub-state in the HSM, and wherein the child sub-state of the intermediate version is enabled to pass by default an unconsumed event having an undefined state to transition to, to the parent sub-state of the child sub-state; and
based on the intermediate version, enabling an event-state engine to transition from the child sub-state to the third sub-state in response to receiving an event that was unconsumed by the child sub-state and passed by default to the parent sub-state, further enabling the event-state engine to invoke at lest one user interface element associated with the third sub-state of the HSM for an application.

2. The method of claim 1, wherein the application is executed on at least one of an embedded device, a mobile device, or an audio-visual set-top box.

3. The method of claim 1, wherein the configuration file includes a hierarchical markup language text file.

4. The method of claim 1, further comprising combining branding information with the intermediate version to generate a combined intermediate version, and based on the combined intermediate version, enabling the event state engine to display the branding information.

5. A processor readable storage medium configured to include program instructions for performing the method of claim 1.

6. A system for application generation, comprising:
a network device, including:
a processor;
a memory in communication with the processor; and
a translator stored in the memory and operable by the processor to perform the actions comprising:
receiving a configuration file that defines a hierarchical state machine (HSM);
generating an intermediate version of the HSM based on the received definition of the HSM, wherein the intermediate version of the HSM includes linked-lists corresponding to at least some elements of the configuration file, wherein the linked-list further comprises a top-state and at least one sub-state, said top-state comprising of information for traversing the linked-list and processing the sub-states and said sub-states comprising a pointer to a parent sub-state and an ID of the sub-state, wherein each sub-state of the intermediate version defines a linked-list of user interface (UI) elements, wherein the intermediate version is in a current child sub-state of a parent sub-state, wherein the parent sub-state defines a reaction element defining a transition to a third sub-state in the intermediate version, and wherein the child sub-state of the intermediate version is enabled to pass by default an unconsumed event having an undefined state to transition to, to a parent sub-state of the child sub-state; and
a device in communication with the translator, the device operable to perform actions comprising:
interpreting the intermediate version of the HSM with an event-state engine on an embedded device by transitioning from the child sub-state to the third sub-state in response to receiving an even that was unconsumed by the child sub-state and passed by default to the parent sub-state, further enabling the event-state engine to invoke at least one user interface element associated with the third sub-state of the HSM for an application.

7. The system of claim 6, wherein the device is further operable to perform actions comprising displaying a hierarchical skin associated with an active state of the HSM.

8. The system of claim 6 further comprising, another device operable to provide a template for editing the configuration file.

9. The system of claim 6, wherein interpreting the intermediate version with the event-state engine comprises performing event-processing on at least one event associated with at least one state of the HSM.

10. An apparatus for application generation, comprising:
a transceiver for receiving and sending information to a device;
a processor in communication with the transceiver; and a memory in communication with the processor and useable in storing data and machine instructions that cause the processor to perform actions, including:

receiving a configuration file defining a hierarchical state machine (HSM);

generating an event-driven intermediate version of the HSM based on the received and defined HSM, wherein the intermediate version of the HSM includes linked-lists corresponding to at least some elements of the configuration file, wherein the linked-list further comprises a top-state and at least one sub-state, said top-state comprising of information for traversing the linked-list and processing the sub-states and said sub-states comprising a pointer to a parent sub-state and an ID of the sub-state, wherein each sub-state of the HSM defines a linked list of user interface (UI) elements, wherein the HSM is in a current child sub-state of a parent sub-state, wherein the parent sub-state defines a reaction element defining transition to a third sub-state in the HSM, wherein the event-driven intermediate version is interpretable by an event-state engine on a determined type of device, and wherein the child sub-state of the event-driven intermediate version is enabled to pass by default an unconsumed event having an undefined state to transition to, to the parent sub-state of the child sub-state; and sending the event-driven intermediate version to a device of the determined type for interpretation, wherein the interpretation includes enabling an event-state engine to transition from the child sub-state to the third sub-state in response to receiving an even that was unconsumed by the child sub-state and passed by default to the parent sub-state, further enabling the event-state engine to invoke at least one user interface element associated with the third sub-state of the HSM for an application.

11. The apparatus of claim 10, wherein the actions further comprises sending the event-driven intermediate version to a device of the determined type for displaying a UI associated with a state of the event-driven intermediate version.

12. The apparatus of claim 10, wherein generating comprises parsing the configuration file for a hierarchical skin element to be displayed with an associated state of the HSM.

13. A processor readable storage medium that includes data, wherein the execution of the data provides actions for application generation, the actions comprising: providing a template for editing of a configuration file that includes a definition of a hierarchical state machine (HSM);

generating an intermediate version of the HSM based on the definition of the HSM, wherein the intermediate version of the HSM includes linked-lists corresponding to at least some elements of the configuration file, wherein the linked-list further comprises a top-state and at least one sub-state, said top-state comprising of information for traversing the linked-list and processing the sub-states and said sub-states comprising a pointer to a parent sub-state and an ID of the sub-state, wherein each sub-state of the HSM defines a linked-list of user interface (UI) elements, wherein the HSM is in a current child sub-state of a parent sub-state, wherein the parent sub-state defines a reaction element defining transition to a third sub-state in the HSM, and wherein a child sub-state of the intermediate version is enabled to pass by default an unconsumed event having an undefined state to transition to, to a parent sub-state of the child sub-state; and based on the intermediate version, enabling an event-state engine to transition from the child sub-state to the third sub-state in response to receiving an even that was unconsumed by the child sub-state and passed by default to the parent sub-state, further enabling the event-state engine to invoke at least one user interface element associated with the third sub-state of the HSM for an application.

14. The processor readable storage medium of claim 13, wherein the intermediate version of the HSM is a hierarchical markup language text file.

15. The processor readable storage medium of claim 13, further comprising a library of behaviors to be performed on the device, and wherein generating combines a portion of the library with the intermediate version based on an indication of a behavior to be performed during a state of the HSM.

16. A processor readable storage medium that includes a plurality of processor executable components, the components comprising:

a first component that provides a first template for editing of a configuration file and defining a hierarchical state machine (HSM), wherein the first component further enables generating an intermediate version of the HSM for at least parsing a child markup tag representing a child sub-state embedded within a parent markup tag representing a parent sub-state, wherein the intermediate version of the HSM includes linked-lists corresponding to at least some elements of the configuration file, wherein the linked-list further comprises a top-state and at least one sub-state, said top-state comprising of information for traversing the linked-list and processing the sub-states and said sub-states comprising a pointer to the parent sub-state and an ID of the sub-state, wherein each sub-state of the HSM defines a linked-list of user interface (UI) elements, wherein the HSM is in a current child sub-state of a parent sub-state, and wherein the parent sub-state defines a reaction element defining a transition to a third sub-state in the HSM;

a second component that employs the intermediate version of the HSM for parsing a tag, indicating an event is to be consumed by the child sub-state or passed, by default, to the parent sub-state if the event is unconsumed and the unconsumed event has an undefined sub-state to transition to; and a third component that employs the intermediate version of the HSM for parsing a tag representing a UI element to invoke at least one UI element for the HSM, wherein the UI element is associated with the child sub-state if the event is consumed by the child sub-state or the UI element is associated with the third sub-state if the event is unconsumed by the child sub-state.

17. The processor readable storage medium of claim 16, wherein the components further comprises:

a fourth component for generating an event-driven intermediate representation of the HSM based on the configuration file; and a fifth component for enabling the intermediate representation to display the at least one UI element.

* * * * *